US010130984B2

(12) United States Patent
Luo et al.

(10) Patent No.: US 10,130,984 B2
(45) Date of Patent: Nov. 20, 2018

(54) STEERING YOKE CUTTING EQUIPMENT WITH AUTOMATIC TRANSPORTING SYSTEM

(71) Applicant: Rong Luo, Jiangsu (CN)

(72) Inventors: Rong Luo, Suzhou (CN); Hui Lu, Suzhou (CN); Baolin Zhao, Suzhou (CN)

(73) Assignee: XIONG HUA MACHINERY (SUZHOU) CO., LTD., Suzhou (CN)

( * ) Notice: Subject to any disclaimer, the term of this patent is extended or adjusted under 35 U.S.C. 154(b) by 0 days.

(21) Appl. No.: 15/118,448

(22) PCT Filed: Jul. 14, 2015

(86) PCT No.: PCT/CN2015/083935
§ 371 (c)(1),
(2) Date: Aug. 11, 2016

(87) PCT Pub. No.: WO2016/183919
PCT Pub. Date: Nov. 24, 2016

(65) Prior Publication Data
US 2018/0117658 A1    May 3, 2018

(30) Foreign Application Priority Data

May 18, 2015   (CN) .......................... 2015 1 0253658

(51) Int. Cl.
*B21D 28/04* (2006.01)
*B21D 43/10* (2006.01)
(Continued)

(52) U.S. Cl.
CPC ............. *B21D 28/04* (2013.01); *B21D 28/02* (2013.01); *B21D 43/05* (2013.01); *B21D 43/10* (2013.01);
(Continued)

(58) Field of Classification Search
CPC ........ B21D 28/04; B21D 28/02; B21D 28/00; B21D 43/05; B21D 43/10; B65G 25/02; Y10T 83/929; Y10T 83/0524; Y10T 83/202; Y10T 83/5669; Y10T 83/6492; Y10T 83/6494; Y10T 83/748;
(Continued)

(56) References Cited

U.S. PATENT DOCUMENTS 4,165,667 A  *  8/1979  Brolund ................. B21D 28/04
                                                         266/65
4,711,016 A  *  12/1987  Genschow ......... B23Q 3/15526
                                                         29/27 C
(Continued)

*Primary Examiner* — Phong Nguyen
(74) *Attorney, Agent, or Firm* — Demian K. Jackson; Jackson IPG PLLC

(57) ABSTRACT

A steering yoke cutting equipment with automatic transporting system which comprising a blanking press machine for cutting the yoke, a yoke input mechanism, intermediate transporting mechanism and a yoke output mechanism. The intermediate transporting mechanism which comprising a guide track, two sliding pieces slidably mounted the guide track, sliding piece cylinder, two sets of mechanical hands respectively fix mounted on the two sliding pieces; the yoke input mechanism and the yoke output mechanism are respectively arranged at two end of the intermediate transporting mechanism.

5 Claims, 13 Drawing Sheets

(51) Int. Cl.
 *B21D 43/05* (2006.01)
 *B65G 25/02* (2006.01)
 *B21D 28/02* (2006.01)

(52) U.S. Cl.
 CPC ............. *B65G 25/02* (2013.01); *Y10T 29/51* (2015.01); *Y10T 29/5136* (2015.01); *Y10T 83/6492* (2015.04)

(58) Field of Classification Search
 CPC .............. Y10T 29/00; Y10T 29/59622; Y10T 29/49833; Y10T 29/49835; Y10T 29/51; Y10T 29/5124; Y10T 29/5136; Y10T 29/534
 See application file for complete search history.

(56) References Cited

U.S. PATENT DOCUMENTS

| | | | | |
|---|---|---|---|---|
| 5,566,814 A | * | 10/1996 | Hofele ................... | B21D 43/05 198/621.1 |
| 6,775,888 B1 | * | 8/2004 | Wegener ................ | B21D 43/05 219/121.63 |
| 2016/0144420 A1 | * | 5/2016 | Krause ................... | B21D 43/05 198/750.11 |

* cited by examiner

STEERING YOKE CUTTING EQUIPMENT WITH AUTOMATIC TRANSPORTING SYSTEM

FIELD OF THE INVENTION

The present invention relates to manufacturing equipment of steering yoke in automobile steering system, and more particularly, a steering yoke cutting equipment with automatic transporting system.

BACKGROUND OF THE INVENTION

As shown in FIG. 1, a yoke 90 used in an automobile steering system, the steering which comprising a rod portion 91 and a fork portion 92. According to existing manufacturing technique, the edge of tip 923 of the fork portion 92 is to be cut into arc shape, and the two pairs of diagonal edges of the inner side of the fork portion 92 are to be cut into chamfer (can also be called trimming), FIG. 2 shows the shape of the one pair of the diagonal edges 921 and edge 922 after being cut. Current manufacturing process uses blanking press machine for cutting the tip of fork portion and the two pair of diagonal edges of yoke 90.

SUMMARY OF THE INVENTION

The technical problems that the present invention intends to solve: in the current art, an operator needs to manually move unprocessed yoke to a first type blanking press machine, once the first blanking press machine cuts off the tip of the yoke, the operator yet, has to again, manually move the yoke to a second type blanking press machine to cut off the inner diagonal edges of the yoke, finally, after that, the operator has to manually remove the processed yoke from the second type blanking press machine; thus, during the process, the operator is burdened with a large amount of lifting work, and that the efficiency of the cutting process is hindered.

The present invention offers the following solution:
a steering yoke cutting equipment with automatic transporting system which comprising: a first type blanking press machine for cutting the tip of the fork portion of the yoke, a second type blanking press machine for cutting the two pairs of diagonal edges of the inner side of the fork portion of the yoke, a yoke input mechanism, an intermediate transporting mechanism and a yoke output mechanism.

The first type blanking press machine which comprising a blanking press mechanism and a clamping mechanism; the blanking press mechanism which comprising a punching head for cutting the edges of the yoke, a blanking press activation device for driving the punching head to move levelly, and a blanking press guiding device for guiding the movement of the punching head; the clamping mechanism which comprising a receiving piece, a receiving assembly, and a downward press head, the center of the receiving piece is provided with a vertically opened yoke receiving hole, the side wall of the receiving piece is provided with a passage that allows the punching head to go through, the downward press head is arranged directly above of the yoke receiving hole, the downward press head is driven by a downward press cylinder, and the downward press cylinder is fixed onto a chassis.

The second type blanking press machine which comprising a first second type blanking press machine and a second second type blanking press machine, the first and the second second type blanking press machine both which comprising a blanking press mechanism and a clamping mechanism; the blanking press mechanism which comprising a punching head for cutting the edges of the yoke, a blanking press activation device for driving the punching head to move levelly, and a blanking press guiding device for guiding the movement of the punching head; the clamping mechanism which comprising a receiving piece, a receiving assembly, and a downward press head, the center of the receiving piece is provided with a vertically opened yoke receiving hole, the side wall of the receiving piece is provided with a passage that allows the punching head to go through, the downward press head is arranged directly above of the yoke receiving hole, the downward press head is driven by a downward press cylinder, and the downward press cylinder is fixed onto a chassis.

the intermediate transporting mechanism which comprising a chassis, a pair of parallel tracks transversely fixed onto the chassis, a first sliding piece slidably mounted on the parallel tracks, a second sliding piece slidably mounted on the parallel tracks, a first mechanical hand, a second mechanical hand, a third mechanical hand, a fourth mechanical hand, a first cylinder, and a second cylinder; the first mechanical hand, the second mechanical hand and the third mechanical hand are fixed mounted on the first sliding piece, the fourth mechanical hand is fixed mounted on the second sliding piece, the first mechanical hand, the second mechanical hand, the third mechanical hand and the fourth mechanical hand 48 are sequentially and transversely arranged, the first sliding piece is fix connected with a piston rod of the first cylinder, the second sliding piece is fix connected with a piston rod of the second cylinder, and the first cylinder and the second cylinder are fixed mounted on the chassis; the intermediate transporting mechanism is used for transporting unprocessed yoke from yoke input mechanism to the first type blanking press machine, then to the first second type blanking press machine, then to the second second type blanking press machine, and then finally to the yoke output mechanism.

In the above described intermediate transporting mechanism, the first mechanical hand, the second mechanical hand, the third mechanical hand which all comprising a first lifting cylinder, a first extending cylinder, a first clamping cylinder and a pair of first claws; the first lifting cylinder is fixed mounted on the first sliding piece, the first extending cylinder is fix mounted on a piston of the first lifting cylinder, the first clamping cylinder is fix mounted on a piston rod of the first extending cylinder, the first extending cylinder drives the first clamping to move levelly, the first clamping cylinder moves levelly in a perpendicular direction to the pair of parallel tracks, the first clamping cylinder is a double piston cylinder, and the pair of first claws are fixed mounted on the double pistons of the first clamping cylinder; the first clamping cylinder through a sliding piece is fix mounted on a piston rod of the first extending cylinder, the sliding piece is fix connected with the piston rod of the first extending cylinder, and a cylinder body of the first extending cylinder is provided with a sliding slot that couples with the sliding piece.

In the above described intermediate transporting mechanism, the fourth mechanical hand which comprising a fourth lifting cylinder, a fourth extending cylinder, a fourth clamping cylinder, and a pair of fourth claws; the fourth lifting cylinder is fix mounted on the second sliding piece, the fourth extending cylinder is fix mounted on a piston of the fourth lifting cylinder, the fourth clamping cylinder is fix mounted on a piston rod of the fourth extending cylinder, the fourth extending cylinder drives the fourth clamping to move levelly, the first clamping cylinder moves levelly in a perpendicular direction to the pair of parallel tracks, the fourth clamping cylinder is a double piston cylinder, and the pair of fourth claws are fixed mounted on the double pistons of the fourth clamping cylinder; the fourth clamping cylinder through a sliding piece is fix mounted on a piston rod of the fourth extending cylinder, the sliding piece is fix connected with the piston rod of the fourth extending cylinder, and a cylinder body of the fourth extending cylinder is provided with a sliding slot that couples with the sliding piece.

The yoke input mechanism which comprising a fixing panel, a first supporting frame, a first lifting device, a first level pushing device, and a fifth mechanical hand; the first fixing panel is levelly arranged, the first fixing panel is provided with a pair of parallel first sliding slots, the first sliding slots run through the first fixing panel on the top and bottom planes; the first supporting frame is fixed mounted on the top plane of the first fixing panel, the first supporting frame is provided with multiple sets of same height Y shaped forks, and the first supporting frame is arranged in between the pair of first sliding slots; the first lifting device which comprising a first lifting cylinder arranged below the first fixing panel, two sets of vertically arranged first supporting rods that move in sync with the first lifting cylinder, a pair of first lifting frames, the two sets of first supporting rods are respectively interposed in the pair of first sliding slots, the pair of first lifting frames are respectively fix mounted on the top plane of the two sets of first supporting rods, the pair of first lifting frames are respectively arranged at two sides of the first supporting frame, and the first lifting frame is provided with multiple sets of first Y shaped pieces; the first level pushing device which comprising a levelly arranged first pushing cylinder, a first moving panel fix connected with a piston rod of the first pushing cylinder, the first pushing cylinder is fixed mounted on the first fixing panel, and the first moving panel is provided with a guiding hole, the first supporting rod is interposed in the guiding hole; the fifth mechanical hand is a rotating mechanical hand, the fifth mechanical hand is installed on the chassis of the intermediate transporting mechanism, and the fifth mechanical hand is arranged above of the first supporting frame, close to one end of the pair of parallel tracks.

In the above described yoke input mechanism, the fifth mechanical hand which comprising a fifth linear cylinder, a fifth rotation cylinder, a fifth extending cylinder and a pair of fifth claws; the fifth extending cylinder is a double piston cylinder, the pair of fifth claws are respectively fix mounted on the double pistons of the fifth extending cylinder, and the pair of fifth claws are arranged opposite to each other; the fifth extending cylinder is fix mounted on a rotating part of the fifth rotation cylinder, the fifth rotation cylinder is fix mounted on a piston rod of the fifth linear cylinder, the fifth linear cylinder drives the fifth rotation cylinder to lifting and the fifth linear cylinder is fix mounted on the chassis 41 of the intermediate transporting mechanism.

The yoke output mechanism which comprising a second fixing panel, a second supporting frame, a second lifting device, a second level pushing device, and a sixth mechanical hand; the second fixing panel is levelly arranged; the second supporting frame is fix mounted on the second fixing panel, the second supporting frame is provided with multiple sets of same height Y shaped forks, and the second supporting frame is arranged in between the pair of second sliding slots; the second lifting device which comprising a second lifting cylinder arranged below the second fixing panel, two sets of vertically arranged second supporting rods that move in sync with the second lifting cylinder, a pair of second lifting frames, the two sets of second supporting rods are respectively interposed in the pair of second sliding slots, the pair of second lifting frames are respectively fix mounted on the top plane of the two sets of second supporting rods, the pair of second lifting frames are respectively arranged at two sides of the second supporting frame, and the second lifting frame is provided with multiple sets of second Y shaped pieces; the second level pushing device which comprising a levelly arranged second pushing cylinder, a second t moving panel fix connected with a piston rod of the second pushing cylinder, the second pushing cylinder is fixed mounted on the second fixing panel, and the second moving panel is provided with a guiding hole, the second supporting rod is interposed in the guiding hole; the fifth mechanical hand is a rotating mechanical hand, the sixth mechanical hand is installed on second fixing panel, and the sixth mechanical hand is arranged at the second supporting frame, close to one end of the pair of parallel tracks.

In the above described yoke output mechanism, the sixth mechanical hand which comprising a sixth linear cylinder, a sixth rotation cylinder, a sixth extending cylinder and a pair of sixth claws; the sixth extending cylinder is a double piston cylinder, the pair of sixth claws are respectively fix mounted on the double pistons of the sixth extending cylinder and the pair of sixth claws are arranged opposite to each other; the sixth extending cylinder is fix mounted on a rotating part of the sixth rotation cylinder, the sixth rotation cylinder is fix mounted on a piston rod of the sixth linear cylinder, the sixth linear cylinder drives the sixth rotation cylinder to lifting, the sixth linear cylinder is fix mounted on the second fixing panel and at one end of the second supporting frame, and the sixth rotation cylinder is arranged above of the second supporting frame.

The yoke input mechanism and the yoke output mechanism are respectively arranged at each end of the parallel tracks, the first type blanking press machine, the first second type blanking press machine and the second second blanking press machine are arranged sequentially and transversely between the yoke input mechanism and the yoke output mechanism, and close to the pair of parallel tracks; the distance between the yoke input mechanism and the first type blanking press machine equals the distance between the first type blanking press machine and the first second type blanking press machine; the distance between the first type blanking press machine and the first second type blanking press machine equals the distance between the first second type blanking press machine and the second second type blanking press machine; the distance between the first mechanical hand and the second mechanical hand equals the distance between the second mechanical hand and the third mechanical hand; and the distance between the yoke input mechanism and the first type blanking press machine equals the distance between the first mechanical hand and the second mechanical hand.

In actual operation, the present invention provides the following operation process: First, the yoke input mechanism is in initial operating state, a multiple number of yokes are placed levelly on the first supporting frame, each yoke is supported by a set of first Y shaped fork, each end of the yoke extends out of the first supporting frame in a certain distance, the first pushing cylinder is in zero position, and the first lifting cylinder is fully extended;

second, beginning of operation, the first pushing cylinder is in zero position, the first lifting cylinder returns to zero position, the first lifting cylinder lifts the first lifting frame by the first supporting rod, the first lifting frame located at the two sides of the first supporting frame holds and lifts the yoke by its two end through the first Y shaped piece;

third, the first pushing cylinder is fully extended, the first lifting cylinder remains in zero position, the first pushing cylinder pushes the first moving panel to move, the first moving panel pushes and moves the first supporting rod, the first supporting rod moves the first lifting device forward, as such, the yoke is lifted and pushed to the above of the next position;

fourth, the first pushing cylinder remains in fully extended state, the first lifting cylinder is fully extended, the yoke on the first supporting frame falls into the next position, or as, any one of the yokes on the first supporting frame is moved forward to the next Y shaped fork by the current Y shaped fork; and fifth, the first pushing cylinder returns to zero position, the first lifting cylinder is fully extended, at this time, the first lifting device and the first level pushing device are returning to initial states.

Sixth, the yoke input mechanism conveys each yoke forward in a continuous motion, the fifth mechanical hand grabs the forefront yoke on the first supporting frame and turns the yoke 90 degree to an upright position;

Seventh, the intermediate transferring mechanism is in initial state, the first mechanical hand is located above of the yoke input mechanism, the second mechanical hand is located above of the first type blanking press machine, the third mechanical hand is located above of the first second type blanking press machine, and the fourth mechanical hand 48 is located above of the yoke output mechanism.

Eighth, the first mechanical hand moves downward and grabs the yoke to be processed from the fifth mechanical hand; at the same time, the second mechanical hand moves downward and grabs the yoke that tip portion has been cut into arc shape; at the same time, the third mechanical hand moves downward and grabs the yoke that the pair of diagonal edges have been cut from first second type blanking press machine; and the first mechanical hand, the second mechanical hand and the third mechanical hand moves upward once the appropriate yoke has been grabbed.

Ninth, the first cylinder extends to drive the first sliding piece to move transversely on the guide track, the first mechanical hand, the second mechanical hand and the third mechanical hand are simultaneously moving transversely, the first mechanical hand moves to above of the first type blanking press machine, the second mechanical moves to above of the first second type blanking press machine, and the third mechanical hand moves to above of the second second type blanking press machine; the first mechanical hand moves downward and loads the grabbed yoke into the first type blanking press machine, at the same time, the second mechanical hand moves downward and loads the grabbed yoke into the first second type blanking press machine and the third mechanical hand moves downward and loads the grabbed yoke into the second second type blanking press machine; and the first mechanical hand, the second mechanical hand and the third mechanical hand move upward once the yokes have been loaded.

Tenth, the first extending cylinder returns to zero position and the first sliding piece moves transversely backward on the guide track, the first mechanical hand, the second mechanical hand and the third mechanical hand are simultaneously moving transversely backward, the first mechanical hand returns to above of the yoke input mechanism, the second mechanical hand returns to above of the first type blanking press machine, and the third mechanical hand returns to above of the first second type blanking press machine; at the same time, the second cylinder returns to zero position and allows the second sliding piece to move on the guide track, and the fourth mechanical hand moves to above of the second second type blanking press machine.

Eleventh, the first mechanical hand, the second mechanical hand and the third mechanical hand repeats eighth step; at the same time, the fourth mechanical hand moves downward to grab the processed yoke from the second second type blanking press machine; the first mechanical hand, the second mechanical hand, the third mechanical hand, and the fourth mechanical hand moves upward once the appropriate yoke has been grabbed.

Twelfth, the first mechanical hand, the second mechanical hand and the third mechanical hand repeats ninth step; at the same time, the fourth mechanical hand moves to above of the yoke output mechanism, and the sixth mechanical hand of the yoke output mechanism grabs the yoke from the fourth mechanical hand.

Thirteenth, the yoke output mechanism is in initial state, the second pushing cylinder is in zero position, and the second lifting cylinder is fully extended; begins work, the sixth mechanical hand turns the yoke grabbed from the fourth mechanical hand 90 degree, and places the yoke on the second Y shaped fork on the second supporting frame, the two ends of the placed yoke extend out of the second supporting frame in a certain distance;

fourteenth, the second pushing cylinder is in zero position, the second lifting cylinder moves and returns to zero position, the second lifting cylinder lifts the second lifting frame through the second supporting rod, and the second lifting frame located on two sides of the second supporting frame lift and hold the yoke by its two ends through the second Y shaped fork;

fifteenth, the second pushing cylinder is fully extended, the second lifting cylinder is in zero position, the second pushing cylinder pushes the second moving panel to move, the second moving panel pushes the second supporting rod to move, the second supporting rod drives the second lifting device to move, as such, the yoke is lifted and pushed to the above of the next position;

sixteenth, the second pushing cylinder remains fully extended, the second lifting cylinder is fully extended, the yoke on the second supporting frame falls into the next position, or as any one of the yokes on the second supporting frame is moved forward to the next Y shaped fork by the current Y shaped fork; and seventeenth, the second pushing cylinder returns to zero position, the second lifting cylinder is fully extended, at this time, the second lifting device and the second level pushing device return to initial state.

DETAIL DESCRIPTION OF THE INVENTION

Figure 1:
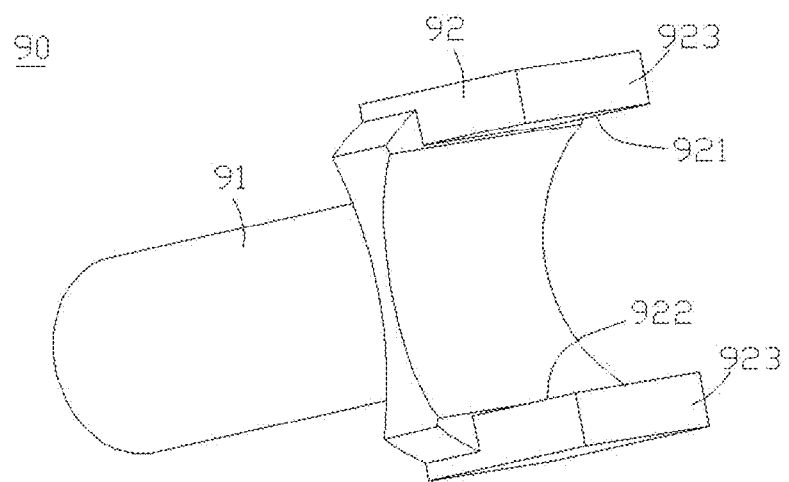
FIG. 1 is a structural view of the yoke 90 in the automobile steering system.
Figure 2:
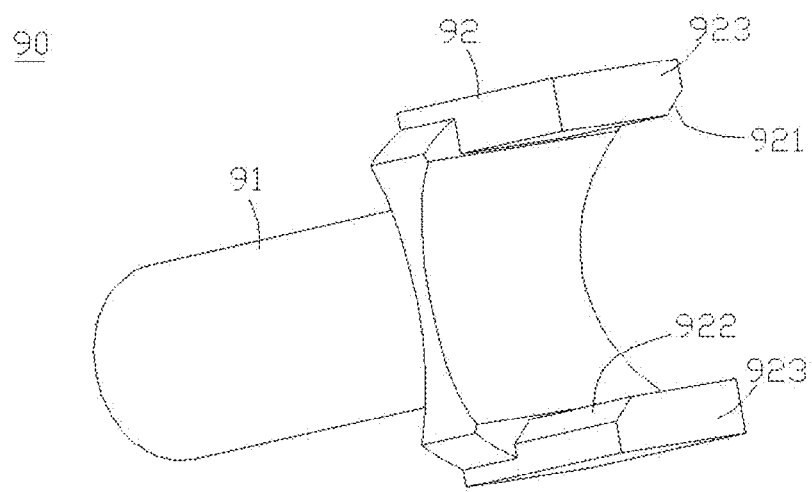
FIG. 2 is a structural view the yoke in FIG. 1 after the diagonal edges have been cut.
Figure 3:
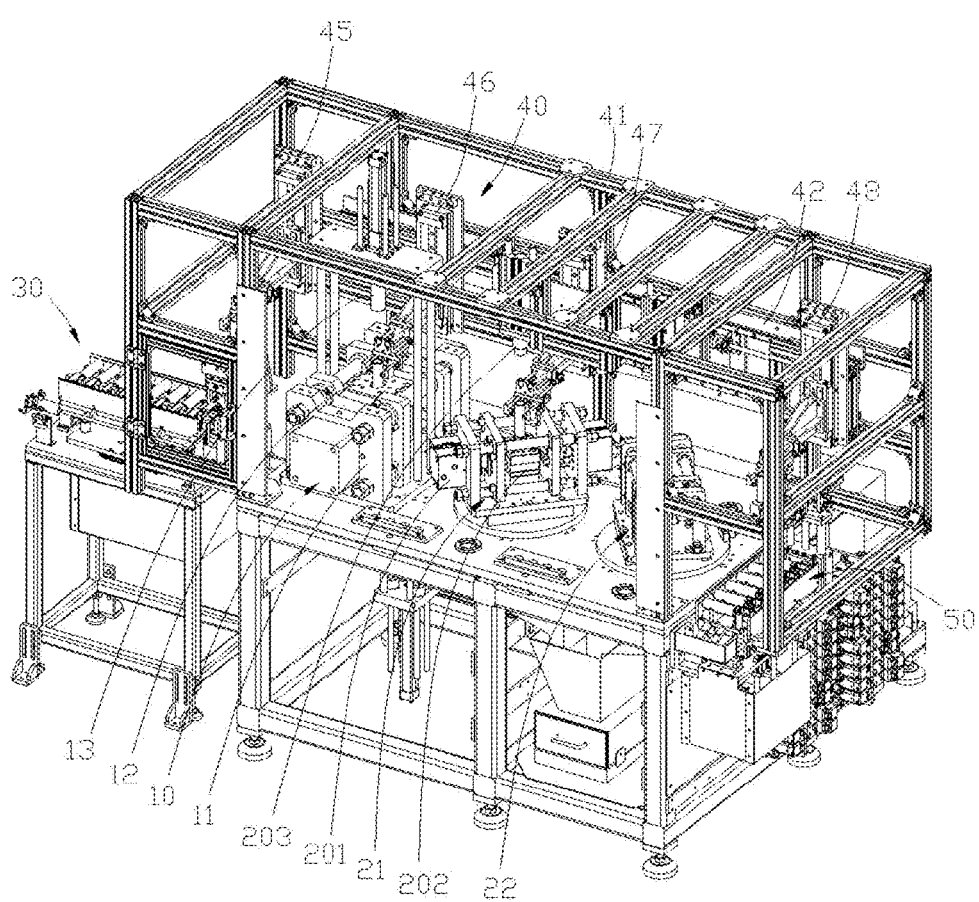
FIG. 3 is an overall structural view of the steering yoke cutting equipment with automatic transporting system in the present invention.

As shown in FIG. 3, a steering yoke cutting equipment with automatic transporting system which comprising: a first type blanking press machine 10 for cutting the tip of the fork portion 92 of the yoke, a second type blanking press machine 20 for cutting the two pairs of diagonal edges of the inner side of the fork portion of the yoke 92, a yoke input mechanism 30, an intermediate transporting mechanism 40 and a yoke output mechanism 50.

As shown in FIG. 3, the first type blanking press machine 10 which comprising a blanking press mechanism 11 and a clamping mechanism; the blanking press mechanism which comprising a punching head for cutting the edges of the yoke, a blanking press activation device for driving the punching head to move levelly, and a blanking press guiding device for guiding the movement of the punching head; the clamping mechanism which comprising a receiving piece 12, a receiving assembly, and a downward press head 13, the center of the receiving piece is provided with a vertically opened yoke receiving hole, the side wall of the receiving piece is provided with a passage that allows the punching head to go through, the downward press head is arranged directly above of the yoke receiving hole, the downward press head is driven by a downward press cylinder, and the downward press cylinder is fixed onto a chassis 42.

Figure 4:
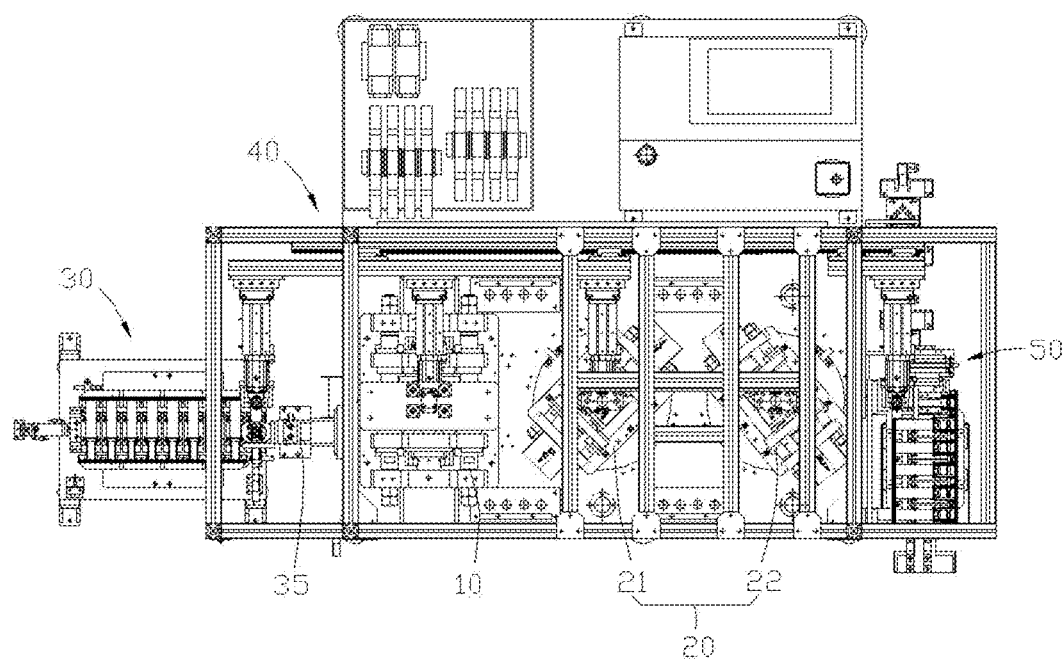
FIG. 4 is a top plane view of FIG. 3.
Figure 5:
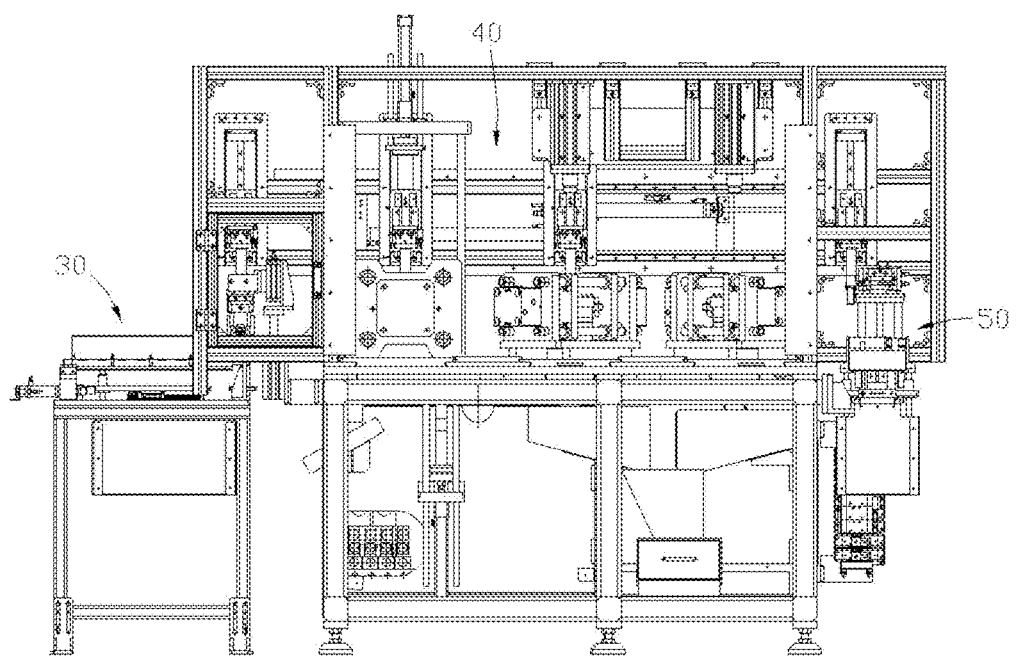
FIG. 5 is a bottom plane view of FIG. 4.
Figure 6:
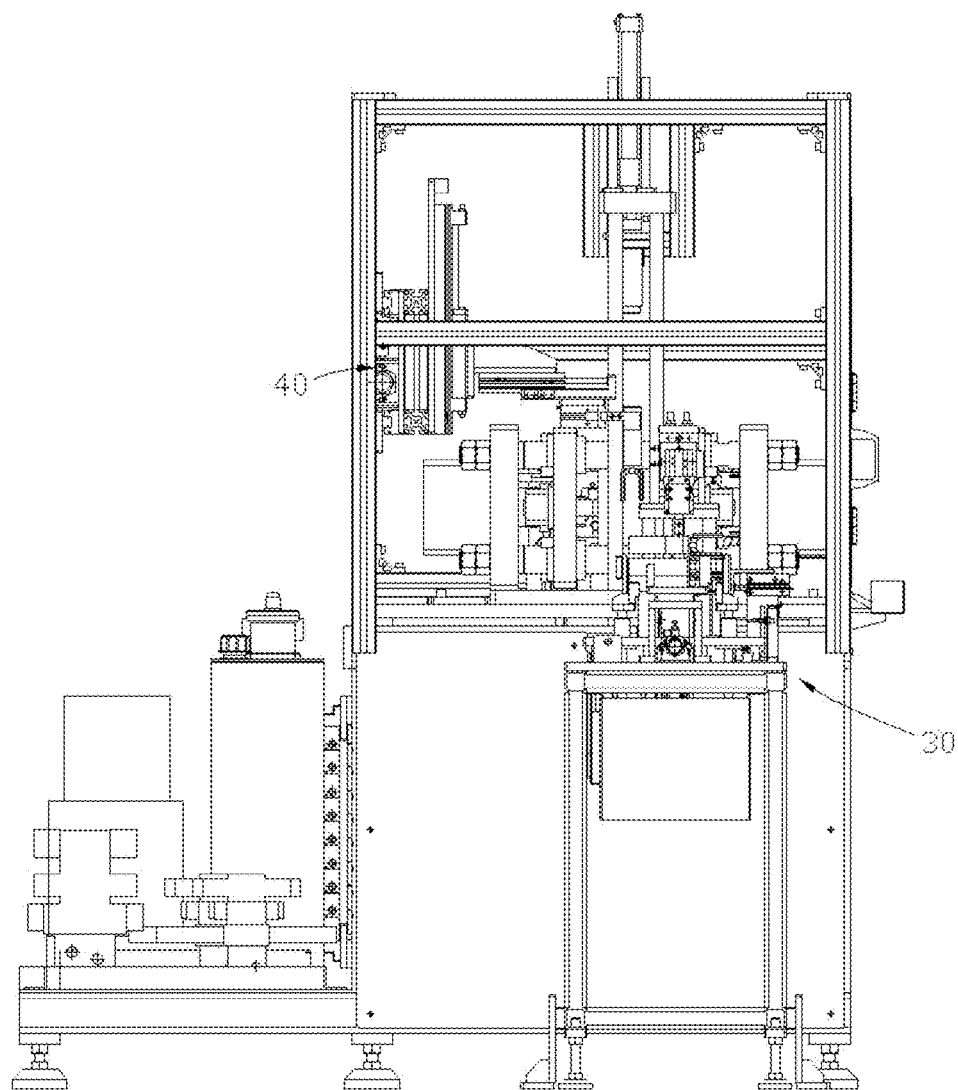
FIG. 6 is a left side view of FIG. 5
Figure 7:
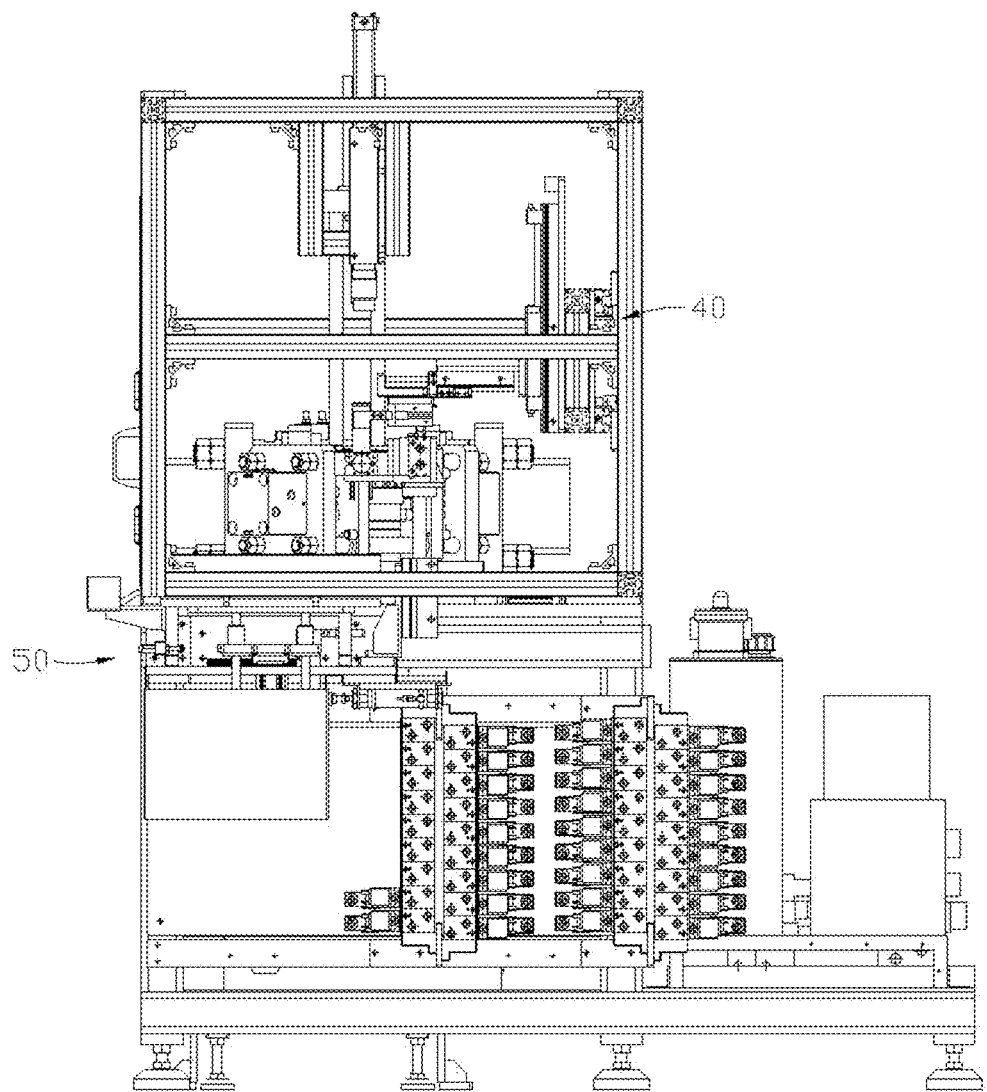
FIG. 7 is a right side view of FIG. 5.
Figure 8:
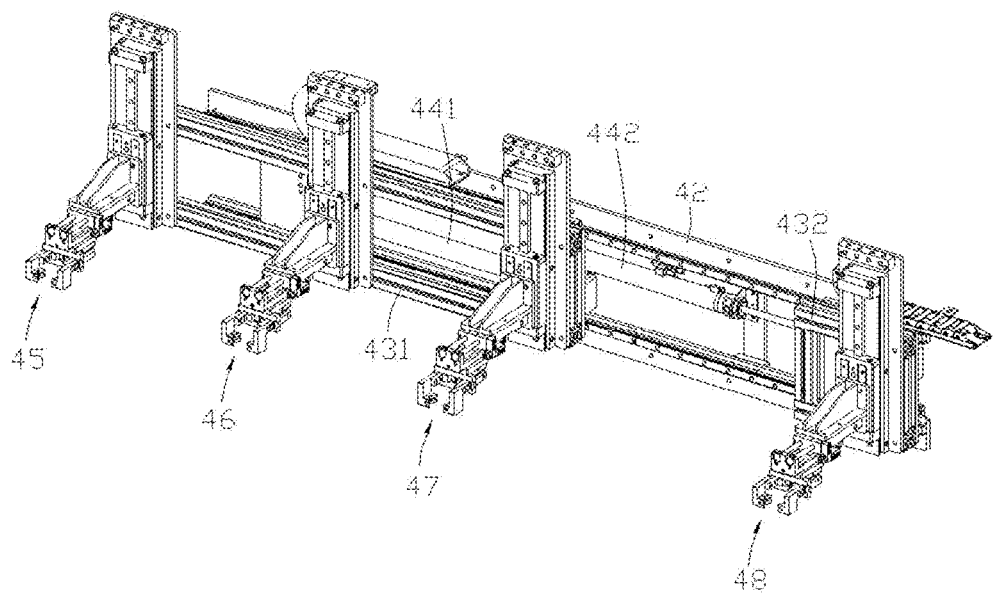
FIG. 8 is a structural view of the intermediate transporting mechanism in FIG. 3.

In combination of FIG. 3 and FIG. 4, the second type blanking press machine 20 which comprising a first second type blanking press machine 21 and a second second type blanking press machine 22, the first and the second second type blanking press machine both which comprising a blanking press mechanism 201 and a clamping mechanism; the blanking press mechanism 201 which comprising a punching head for cutting the edges of the yoke, a blanking press activation device for driving the punching head to move levelly, and a blanking press guiding device for guiding the movement of the punching head; the clamping mechanism which comprising a receiving piece 202, a receiving assembly, and a downward press head 203, the center of the receiving piece 202 is provided with a vertically opened yoke receiving hole, the side wall of the receiving piece is provided with a passage that allows the punching head to go through, the downward press head is arranged directly above of the yoke receiving hole, the downward press head is driven by a downward press cylinder, and the downward press cylinder is fixed onto a chassis 42.

In combination of FIG. 3~FIG. 6 and FIG. 8, the intermediate transporting mechanism 40 which comprising a chassis 41, a pair of parallel tracks 42 transversely fixed onto the chassis 41, a first sliding piece 431 slidably mounted on the parallel tracks 42, a second sliding piece 432 slidably mounted on the parallel tracks 42, a first mechanical hand 45, a second mechanical hand 46, a third mechanical hand 47, a fourth mechanical hand 48, a first cylinder 441, and a second cylinder 442; the first mechanical hand 45, the second mechanical hand 46 and the third mechanical hand are fixed mounted on the first sliding piece 461, the fourth mechanical hand 48 is fixed mounted on the second sliding piece 432, the first mechanical hand 45, the second mechanical hand 46, the third mechanical hand 47 and the fourth mechanical hand 48 are sequentially and transversely arranged, the first sliding piece 431 is fix connected with a piston rod of the first cylinder 441, the second sliding piece 432 is fix connected with a piston rod of the second cylinder 442, and the first cylinder 441 and the second cylinder 442 are fixed mounted on the chassis 41; the intermediate transporting mechanism 40 is used for transporting unprocessed yoke from yoke input mechanism 30 to the first type blanking press machine 10, then to the first second type blanking press machine 21, then to the second second type blanking press machine 22, and then finally to the yoke output mechanism 50.

Figure 9:
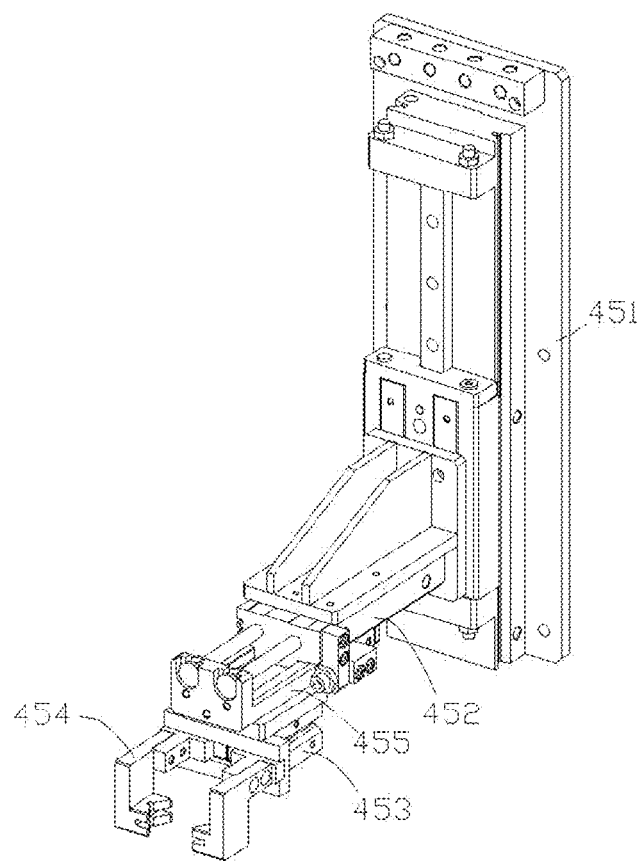
FIG. 9 is a structural view of the first, second and third mechanical hand.

In the above described intermediate transporting mechanism 40, as shown in FIG. 9, the first mechanical hand 45, the second mechanical hand 46, the third mechanical hand 47 which all comprising a first lifting cylinder 451, a first extending cylinder 452, a first clamping cylinder 453 and a pair of first claws 454; the first lifting cylinder 451 is fixed mounted on the first sliding piece 431, the first extending cylinder 452 is fix mounted on a piston of the first lifting cylinder 451, the first clamping cylinder 453 is fix mounted on a piston rod of the first extending cylinder 452, the first extending cylinder 452 drives the first clamping 453 to move levelly, the first clamping cylinder 453 moves levelly in a perpendicular direction to the pair of parallel tracks 42, the first clamping cylinder 453 is a double piston cylinder, and the pair of first claws are fixed mounted on the double pistons of the first clamping cylinder 453; the first clamping cylinder 453 through a sliding piece 455 is fix mounted on a piston rod of the first extending cylinder 452, the sliding piece 455 is fix connected with the piston rod of the first extending cylinder 452, and a cylinder body of the first extending cylinder 452 is provided with a sliding slot that couples with the sliding piece 455.

In the above described intermediate transporting mechanism 40, the fourth mechanical hand 48 which comprising a fourth lifting cylinder, a fourth extending cylinder, a fourth clamping cylinder, and a pair of fourth claws; the fourth lifting cylinder is fix mounted on the second sliding piece, the fourth extending cylinder is fix mounted on a piston of the fourth lifting cylinder, the fourth clamping cylinder is fix mounted on a piston rod of the fourth extending cylinder, the fourth extending cylinder 452 drives the fourth clamping 453 to move levelly, the first clamping cylinder 453 moves levelly in a perpendicular direction to the pair of parallel tracks, the fourth clamping cylinder is a double piston cylinder, and the pair of fourth claws are fixed mounted on the double pistons of the fourth clamping cylinder; the fourth clamping cylinder through a sliding piece is fix mounted on a piston rod of the fourth extending cylinder, the sliding piece is fix connected with the piston rod of the fourth extending cylinder, and a cylinder body of the fourth extending cylinder is provided with a sliding slot that couples with the sliding piece.

Figure 10:
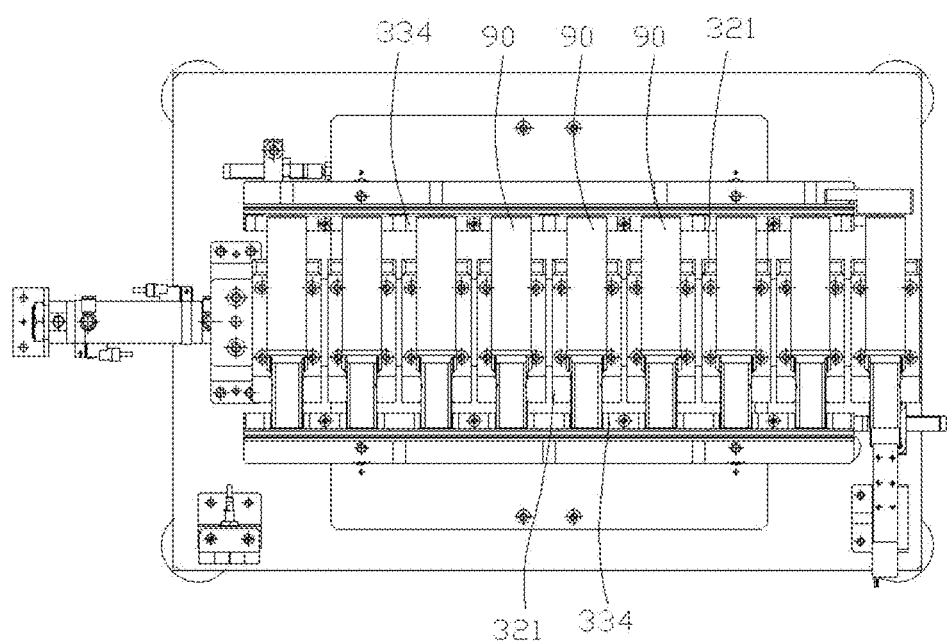
FIG. 10 is a structural view of the yoke input mechanism in FIG. 3.
Figure 11:
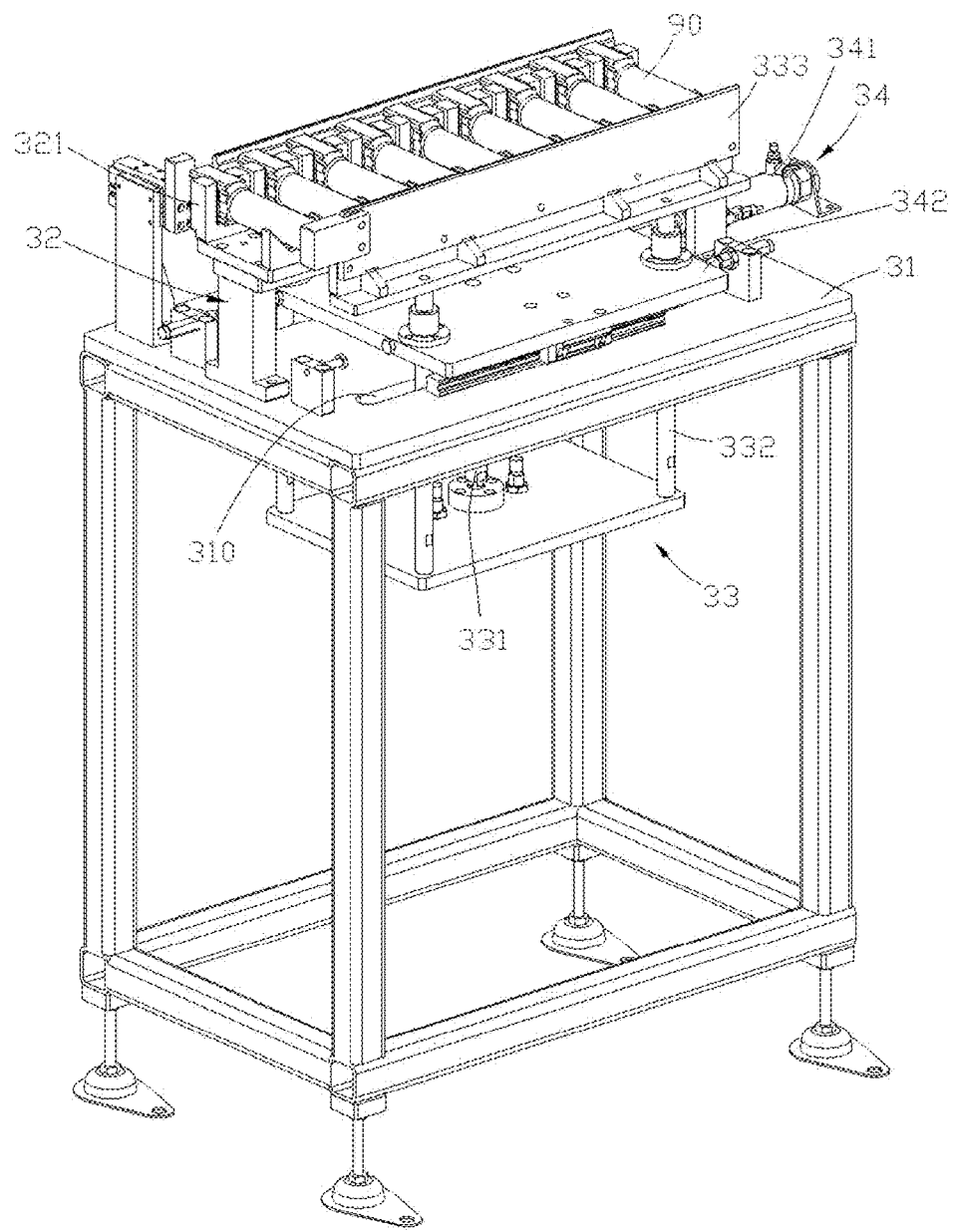
FIG. 11 is a top right side structural view of the yoke input mechanism in FIG. 10.

In combination of FIG. 10 and FIG. 11, the yoke input mechanism 30 which comprising a fixing panel 31, a first supporting frame 32, a first lifting device 33, a first level pushing device 34, and a fifth mechanical hand 35; the first fixing panel 31 is levelly arranged, the first fixing panel 31 is provided with a pair of parallel first sliding slots 310, the first sliding slots 310 run through the first fixing panel 31 on the top and bottom planes; the first supporting frame 32 is fixed mounted on the top plane of the first fixing panel 31, the first supporting frame 32 is provided with multiple sets of same height Y shaped forks 321, and the first supporting frame 32 is arranged in between the pair of first sliding slots 310; the first lifting device 33 which comprising a first lifting cylinder 331 arranged below the first fixing panel 31, two sets of vertically arranged first supporting rods 332 that move in sync with the first lifting cylinder 331, a pair of first lifting frames 333, the two sets of first supporting rods 332 are respectively interposed in the pair of first sliding slots 310, the pair of first lifting frames 333 are respectively fix mounted on the top plane of the two sets of first supporting rods 332, the pair of first lifting frames 333 are respectively arranged at two sides of the first supporting frame 32, and the first lifting frame 333 is provided with multiple sets of first Y shaped pieces 334; the first level pushing device 34 which comprising a levelly arranged first pushing cylinder 341, a first moving panel 342 fix connected with a piston rod of the first pushing cylinder 341, the first pushing cylinder 341 is fixed mounted on the first fixing panel 31, and the first moving panel 342 is provided with a guiding hole, the first supporting rod 332 is interposed in the guiding hole; as shown in FIG. 4, the fifth mechanical hand 35 is a rotating mechanical hand, the fifth mechanical hand is installed on the chassis 41 of the intermediate transporting mechanism 40, and the fifth mechanical hand 35 is arranged above of the first supporting frame 32, close to one end of the pair of parallel tracks 42.

In the above described yoke input mechanism 30, the fifth mechanical hand 35 which comprising a fifth linear cylinder, a fifth rotation cylinder, a fifth extending cylinder and a pair of fifth claws; the fifth extending cylinder is a double piston cylinder, the pair of fifth claws are respectively fix mounted on the double pistons of the fifth extending cylinder, and the pair of fifth claws are arranged opposite to each other; the fifth extending cylinder is fix mounted on a rotating part of the fifth rotation cylinder, the fifth rotation cylinder is fix mounted on a piston rod of the fifth linear cylinder, the fifth linear cylinder drives the fifth rotation cylinder to lifting and the fifth linear cylinder is fix mounted on the chassis 41 of the intermediate transporting mechanism.

Figure 12:
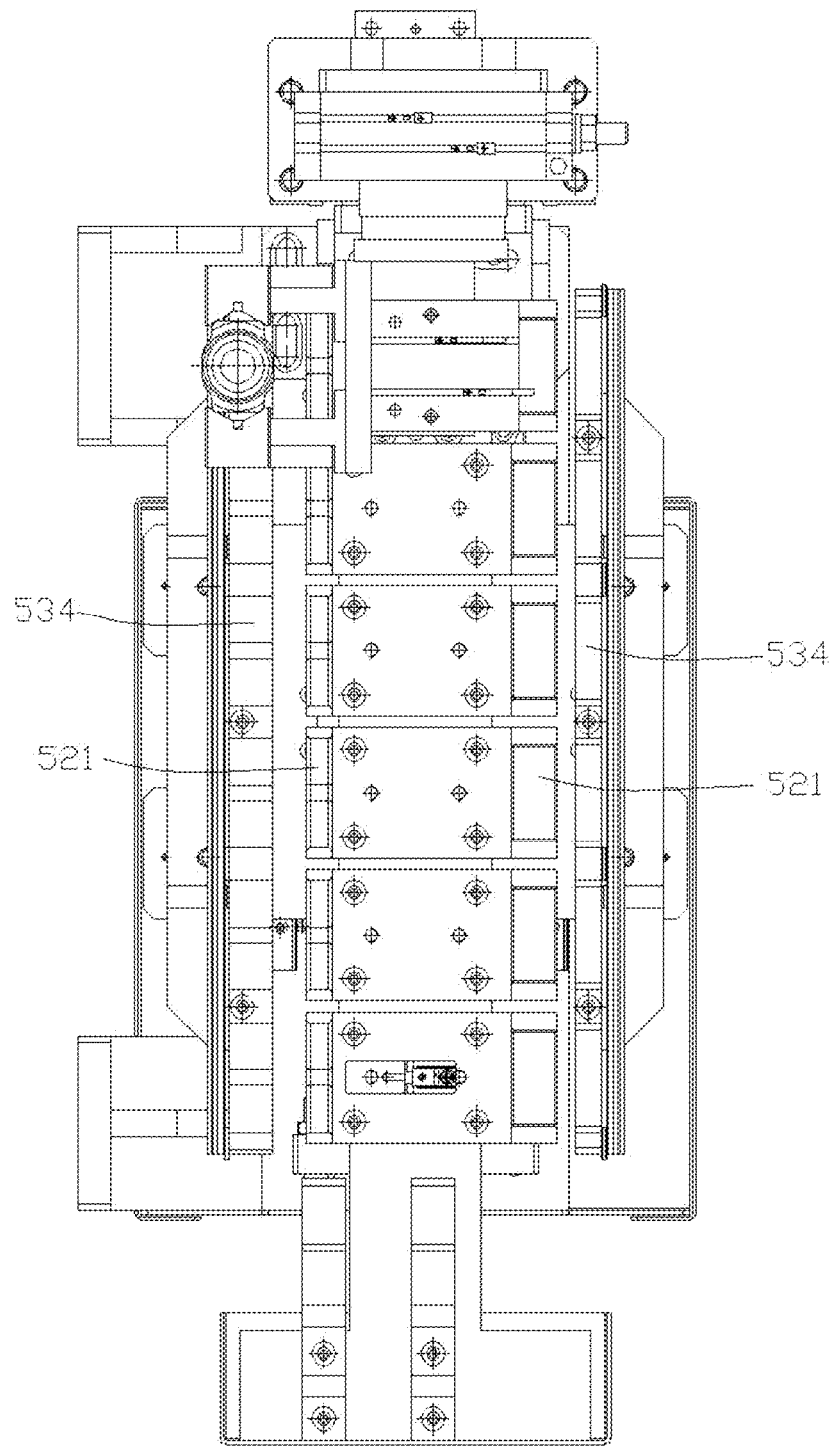
FIG. 12 is a structural view of the yoke output mechanism in FIG. 3.
Figure 13:
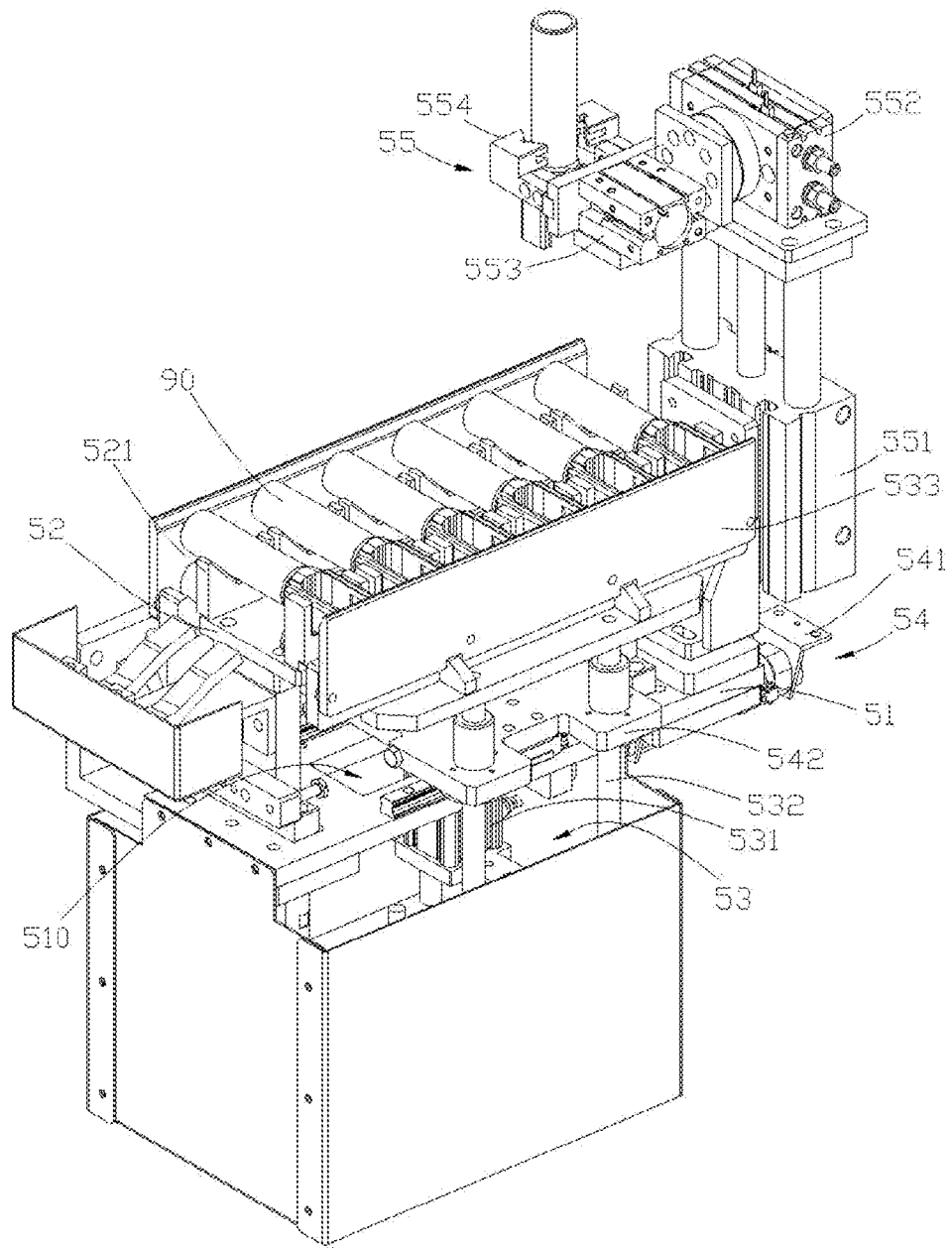
FIG. 13 is a bottom right side structural view of the yoke output mechanism in FIG. 12.

In combination of FIG. 12 and FIG. 13, the yoke output mechanism 50 which comprising a second fixing panel 51, a second supporting frame 52, a second lifting device 53, a second level pushing device 54, and a sixth mechanical hand 55; the second fixing panel 51 is levelly arranged; the second supporting frame 52 is fix mounted on the second fixing panel 51, the second supporting frame 52 is provided with multiple sets of same height Y shaped forks 521, and the second supporting frame 52 is arranged in between the pair of second sliding slots 510; the second lifting device 53 which comprising a second lifting cylinder 531 arranged below the second fixing panel 51, two sets of vertically arranged second supporting rods 532 that move in sync with the second lifting cylinder 531, a pair of second lifting frames 533, the two sets of second supporting rods 532 are respectively interposed in the pair of second sliding slots 510, the pair of second lifting frames 533 are respectively fix mounted on the top plane of the two sets of second supporting rods 532, the pair of second lifting frames 533 are respectively arranged at two sides of the second supporting frame 52, and the second lifting frame 533 is provided with multiple sets of second Y shaped pieces 534; the second level pushing device 54 which comprising a levelly arranged second pushing cylinder 541, a second t moving panel 542 fix connected with a piston rod of the second pushing cylinder 541, the second pushing cylinder 541 is fixed mounted on the second fixing panel 51, and the second moving panel 542 is provided with a guiding hole, the second supporting rod 532 is interposed in the guiding hole; as shown in FIG. 4, the fifth mechanical hand 55 is a rotating mechanical hand, the sixth mechanical hand is installed on second fixing panel 51, and the sixth mechanical hand 55 is arranged at the second supporting frame 52, close to one end of the pair of parallel tracks 42.

In the above described yoke output mechanism 50, as shown in FIG. 13, the sixth mechanical hand 55 which comprising a sixth linear cylinder 551, a sixth rotation cylinder 552, a sixth extending cylinder 553 and a pair of sixth claws 554; the sixth extending cylinder 553 is a double piston cylinder, the pair of sixth claws 554 are respectively fix mounted on the double pistons of the sixth extending cylinder 553, and the pair of sixth claws 554 are arranged opposite to each other; the sixth extending cylinder 553 is fix mounted on a rotating part of the sixth rotation cylinder 552, the sixth rotation cylinder 552 is fix mounted on a piston rod of the sixth linear cylinder 551, the sixth linear cylinder 551 drives the sixth rotation cylinder 552 to lifting, the sixth linear cylinder 551 is fix mounted on the second fixing panel 51 and at one end of the second supporting frame 52, and the sixth rotation cylinder 552 is arranged above of the second supporting frame 52.

In combination of FIG. 3~FIG. 6, the yoke input mechanism 30 and the yoke output mechanism 50 are respectively arranged at each end of the parallel tracks 42, the first type blanking press machine 10, the first second type blanking press machine 20 and the second second blanking press machine 22 are arranged sequentially and transversely between the yoke input mechanism 30 and the yoke output mechanism 50, and close to the pair of parallel tracks 42; the distance between the yoke input mechanism 30 and the first type blanking press machine 10 equals the distance between the first type blanking press machine and the first second type blanking press machine; the distance between the first type blanking press machine 10 and the first second type blanking press machine 21 equals the distance between the first second type blanking press machine 21 and the second second type blanking press machine 22; the distance between the first mechanical hand 45 and the second mechanical hand 46 equals the distance between the second mechanical hand 46 and the third mechanical hand 47; and the distance between the yoke input mechanism 30 and the first type blanking press machine 10 equals the distance between the first mechanical hand 45 and the second mechanical hand 46.

In actual operation, the present invention provides the following operation process:

First, the yoke input mechanism 30 is in initial operating state, a multiple number of yokes 90 are placed levelly on the first supporting frame 32, each yoke is supported by a set of first Y shaped fork 321, each end of the yoke extends out of the first supporting frame 32 in a certain distance, the first pushing cylinder 341 is in zero position, and the first lifting cylinder 331 is fully extended;

second, beginning of operation, the first pushing cylinder 341 is in zero position, the first lifting cylinder 331 returns to zero position, the first lifting cylinder 331 lifts the first lifting frame 333 by the first supporting rod 332, the first lifting frame 333 located at the two sides of the first supporting frame 32 holds and lifts the yoke by it's two end through the first Y shaped piece 334;

third, the first pushing cylinder is fully extended, the first lifting cylinder remains in zero position, the first pushing cylinder 341 pushes the first moving panel 342 to move, the first moving panel 342 pushes and moves the first supporting rod 332, the first supporting rod 332 moves the first lifting device 33 forward, as such, the yoke is lifted and pushed to the above of the next position;

fourth, the first pushing cylinder 341 remains in fully extended state, the first lifting cylinder 331 is fully extended, the yoke on the first supporting frame 32 falls into the next position, or as, any one of the yokes on the first supporting frame 32 is moved forward to the next Y shaped fork by the current Y shaped fork; and fifth, the first pushing cylinder 341 returns to zero position, the first lifting cylinder 331 is fully extended, at this time, the first lifting device and the first level pushing device are returning to initial states.

Sixth, the yoke input mechanism 30 conveys each yoke forward in a continuous motion, the fifth mechanical hand 35 grabs the forefront yoke on the first supporting frame and turns the yoke 90 degree to an upright position;

Seventh, the intermediate transferring mechanism is in initial state, the first mechanical hand 45 is located above of the yoke input mechanism 10, the second mechanical hand 46 is located above of the first type blanking press machine 20, the third mechanical hand 47 is located above of the first second type blanking press machine 31, and the fourth mechanical hand 48 is located above of the yoke output mechanism 50, as shown in FIG. 10.

Eighth, the first mechanical hand 45 moves downward and grabs the yoke to be processed from the fifth mechanical hand 35; at the same time, the second mechanical hand 46 moves downward and grabs the yoke that tip portion has been cut into arc shape; at the same time, the third mechanical hand 47 moves downward and grabs the yoke that the pair of diagonal edges have been cut from first second type blanking press machine 31; and the first mechanical hand 45, the second mechanical hand 46 and the third mechanical hand 47 moves upward once the appropriate yoke has been grabbed.

Ninth, the first cylinder 441 extends to drive the first sliding piece 431 to move transversely on the guide track 42, the first mechanical hand 45, the second mechanical hand 46 and the third mechanical hand 47 are simultaneously moving transversely, the first mechanical hand 45 moves to above of the first type blanking press machine 20, the second mechanical 46 moves to above of the first second type blanking press machine 31, and the third mechanical hand 7 moves to above of the second second type blanking press machine 32; the first mechanical hand 45 moves downward and loads the grabbed yoke into the first type blanking press machine 20, at the same time, the second mechanical hand 46 moves downward and loads the grabbed yoke into the first second type blanking press machine 31 and the third mechanical hand 47 moves downward and loads the grabbed yoke into the second second type blanking press machine 32; and the first mechanical hand 45, the second mechanical hand 46 and the third mechanical hand 47 move upward once the yokes have been loaded, as shown in FIG. 11.

Tenth, the first extending cylinder 441 returns to zero position and the first sliding piece 431 moves transversely backward on the guide track 42, the first mechanical hand 45, the second mechanical hand 46 and the third mechanical hand 47 are simultaneously moving transversely backward, the first mechanical hand 45 returns to above of the yoke input mechanism 10, the second mechanical hand 46 returns to above of the first type blanking press machine 20, and the third mechanical hand 47 returns to above of the first second type blanking press machine 31; at the same time, the second cylinder 442 returns to zero position and allows the second sliding piece 432 to move on the guide track 42, and the fourth mechanical hand 48 moves to above of the second second type blanking press machine 32, as shown in FIG. 12.

Eleventh, the first mechanical hand 45, the second mechanical hand 46 and the third mechanical hand 47 repeats eighth step; at the same time, the fourth mechanical hand 48 moves downward to grab the processed yoke from the second second type blanking press machine 32; the first mechanical hand 45, the second mechanical hand 46, the third mechanical hand 47, and the fourth mechanical hand 48 moves upward once the appropriate yoke has been grabbed.

Twelfth, the first mechanical hand 45, the second mechanical hand 46 and the third mechanical hand 47 repeats ninth step; at the same time, the fourth mechanical hand 48 moves to above of the yoke output mechanism 50, and the sixth mechanical hand 50 of the yoke output mechanism 50 grabs the yoke from the fourth mechanical hand.

Thirteenth, the yoke output mechanism 50 is in initial state, the second pushing cylinder 541 is in zero position, and the second lifting cylinder 531 is fully extended; begins work, the sixth mechanical hand 55 turns the yoke grabbed from the fourth mechanical hand 90 degree, and places the yoke on the second Y shaped fork 521 on the second supporting frame 52, the two ends of the placed yoke extend out of the second supporting frame in a certain distance;

fourteenth, the second pushing cylinder 541 is in zero position, the second lifting cylinder 531 moves and returns to zero position, the second lifting cylinder 531 lifts the second lifting frame 533 through the second supporting rod 532, and the second lifting frame located on two sides of the second supporting frame lift and hold the yoke by its two ends through the second Y shaped fork 531;

fifteenth, the second pushing cylinder 541 is fully extended, the second lifting cylinder 531 is in zero position, the second pushing cylinder 541 pushes the second moving panel 542 to move, the second moving panel 542 pushes the second supporting rod to move, the second supporting rod drives the second lifting device to move, as such, the yoke is lifted and pushed to the above of the next position;

sixteenth, the second pushing cylinder remains fully extended, the second lifting cylinder is fully extended, the yoke on the second supporting frame falls into the next position, or as any one of the yokes on the second supporting frame is moved forward to the next Y shaped fork by the current Y shaped fork; and seventeenth, the second pushing cylinder returns to zero position, the second lifting cylinder is fully extended, at this time, the second lifting device and the second level pushing device return to initial state.

Although the invention has been explained in relation to its preferred embodiment, it is to be understood that many other possible modifications and variations can be made without departing from the spirit and scope of the invention as hereinafter claimed.

The invention claimed is:

1. A steering yoke cutting equipment with an automatic transporting system comprising a first type blanking press machine for cutting a tip of a fork portion of the yoke, and a second type blanking press machine for cutting two pairs of diagonal edges of an inner side of the fork portion of the yoke, the second type blanking press machine comprising a first second type blanking press machine and a second second type blanking press machine;

the steering yoke cutting equipment with the automatic transporting system further comprising a yoke input mechanism, an intermediate transporting mechanism and a yoke output mechanism;
- wherein the intermediate transporting mechanism comprises a chassis, a pair of parallel tracks transversely fixed onto the chassis, a first sliding piece slidably mounted on the parallel tracks, a second sliding piece slidably mounted on the parallel tracks, a first mechanical hand, a second mechanical hand, a third mechanical hand, a fourth mechanical hand, a first cylinder, and a second cylinder; the first mechanical hand, the second mechanical hand and the third mechanical hand are fixedly mounted on the first sliding piece, the fourth mechanical hand is fixedly mounted on the second sliding piece, the first mechanical hand, the second mechanical hand, the third mechanical hand and the fourth mechanical hand are sequentially and transversely arranged, the first sliding piece is fixedly connected with a piston rod of the first cylinder, the second sliding piece is fixedly connected with a piston rod of the second cylinder, and the first cylinder and the second cylinder are fixedly mounted on the chassis; the intermediate transporting mechanism is used for transporting unprocessed yoke from the yoke input mechanism to the first type blanking press machine, then to the first second type blanking press machine, then to the second second type blanking press machine, and then finally to the yoke output mechanism;
- wherein the yoke input mechanism comprises a first fixing panel, a first supporting frame, a first lifting device, a first level pushing device, and a fifth mechanical hand;
  - wherein the first fixing panel is levelly arranged, the first fixing panel is provided with a pair of parallel first sliding slots, the first sliding slots run through the first fixing panel on the top and bottom planes;
  - wherein the first supporting frame is fixedly mounted on the top plane of the first fixing panel, the first supporting frame is provided with multiple sets of same height Y-shaped forks, and the first supporting frame is arranged in between the pair of first sliding slots;
  - wherein the first lifting device comprises a first lifting cylinder arranged below the first fixing panel, two sets of vertically arranged first supporting rods that move in sync with the first lifting cylinder, a pair of first lifting frames, the two sets of first supporting rods are respectively interposed in the pair of first sliding slots, the pair of first lifting frames are respectively fixedly mounted on the top plane of the two sets of first supporting rods, the pair of first lifting frames are respectively arranged at two sides of the first supporting frame, and the first lifting frame is provided with multiple sets of first Y shaped pieces;
  - wherein the first level pushing device comprises a levelly arranged first pushing cylinder, a first moving panel fixedly connected with a piston rod of the first pushing cylinder, the first pushing cylinder is fixedly mounted on the first fixing panel, and the first moving panel is provided with a guiding hole, the first supporting rod is interposed in the guiding hole; and
  - wherein the fifth mechanical hand is a rotating mechanical hand, the fifth mechanical hand is installed on the chassis of the intermediate transporting mechanism, and the fifth mechanical hand is arranged above of the first supporting frame, close to one end of the pair of parallel tracks;
- wherein the yoke output mechanism comprises a second fixing panel, a second supporting frame, a second lifting device, a second level pushing device, and a sixth mechanical hand;
  - wherein the second fixing panel is levelly arranged;
  - wherein the second supporting frame is fixedly mounted on the second fixing panel, the second supporting frame is provided with multiple sets of same height Y-shaped forks, and the second supporting frame is arranged in between the pair of second sliding slots;
  - wherein the second lifting device comprises a second lifting cylinder arranged below the second fixing panel, two sets of vertically arranged second supporting rods that move in sync with the second lifting cylinder, a pair of second lifting frames, the two sets of second supporting rods are respectively interposed in the pair of second sliding slots, the pair of second lifting frames are respectively fixedly mounted on the top plane of the two sets of second supporting rods, the pair of second lifting frames are respectively arranged at two sides of the second supporting frame, and the second lifting frame is provided with multiple sets of second Y-shaped pieces;
  - wherein the second level pushing device comprises a levelly arranged second pushing cylinder, a second moving panel fixedly connected with a piston rod of the second pushing cylinder, the second pushing cylinder is fixedly mounted on the second fixing panel, and the second moving panel is provided with a guiding hole, the second supporting rod is interposed in the guiding hole; and
  - wherein the fifth mechanical hand is a rotating mechanical hand, the sixth mechanical hand is installed on second fixing panel, and the sixth mechanical hand is arranged at the second supporting frame, close to one end of the pair of parallel tracks; and
- wherein the yoke input mechanism and the yoke output mechanism are respectively arranged at each end of the parallel tracks, the first type blanking press machine, the first second type blanking press machine and the second second blanking press machine are arranged sequentially and transversely between the yoke input mechanism and the yoke output mechanism, and close to the pair of parallel tracks;
- wherein the distance between the yoke input mechanism and the first type blanking press machine equals the distance between the first type blanking press machine and the first second type blanking press machine;
- wherein the distance between the first type blanking press machine and the first second type blanking press machine equals the distance between the first second type blanking press machine and the second second type blanking press machine; and
- wherein the distance between the first mechanical hand and the second mechanical hand equals the distance between the second mechanical hand and the third mechanical hand; and the distance between the yoke input mechanism and the first type blanking press machine equals the distance between the first mechanical hand and the second mechanical hand.

2. The steering yoke cutting equipment with the automatic transporting system as claimed in claim 1, wherein the sixth mechanical hand comprises a sixth linear cylinder, a sixth rotation cylinder, a sixth extending cylinder and a pair of sixth claws;
wherein the sixth extending cylinder is a double piston cylinder, the pair of sixth claws are respectively fixedly mounted on the double pistons of the sixth extending cylinder, and the pair of sixth claws are arranged opposite to each other;
wherein the sixth extending cylinder is fixedly mounted on a rotating part of the sixth rotation cylinder, the sixth rotation cylinder is fixedly mounted on a piston rod of the sixth linear cylinder, the sixth linear cylinder drives the sixth rotation cylinder, the sixth linear cylinder is fixedly mounted on the second fixing panel and at one end of the second supporting frame, and the sixth rotation cylinder is arranged above of the second supporting frame.

3. The steering yoke cutting equipment with automatic transporting system as claimed in claim 1, wherein the fifth mechanical hand comprises a fifth linear cylinder, a fifth rotation cylinder, a fifth extending cylinder and a pair of fifth claws;
wherein the fifth extending cylinder is a double piston cylinder, the pair of fifth claws are respectively fixedly mounted on the double pistons of the fifth extending cylinder, and the pair of fifth claws are arranged opposite to each other;
wherein the fifth extending cylinder is fixedly mounted on a rotating part of the fifth rotation cylinder, the fifth rotation cylinder is fixedly mounted on a piston rod of the fifth linear cylinder, the fifth linear cylinder drives the fifth rotation cylinder and the fifth linear cylinder is fixedly mounted on the chassis of the intermediate transporting mechanism.

4. The steering yoke cutting equipment with automatic transporting system as claimed in claim 1, wherein the first mechanical hand, the second mechanical hand, the third mechanical hand each comprises a first lifting cylinder, a first extending cylinder, a first clamping cylinder and a pair of first claws;
wherein the first lifting cylinder is fixedley mounted on the first sliding piece, the first extending cylinder is fixedly mounted on a piston of the first lifting cylinder, the first clamping cylinder is fixedly mounted on a piston rod of the first extending cylinder, the first extending cylinder drives the first clamping to move levely, the first clamping cylinder moves levely in a perpendicular direction to the pair of parallel tracks, the first clamping cylinder is a double piston cylinder, and the pair of first claws are fixedly mounted on the double pistons of the first clamping cylinder;
wherein the first clamping cylinder through a sliding piece is fixedly mounted on a piston rod of the first extending cylinder, the sliding piece is fixedly connected with the piston rod of the first extending cylinder, and a cylinder body of the first extending cylinder is provided with a sliding slot that couples with the sliding piece.

5. The steering yoke cutting equipment with the automatic transporting system as claimed in claim 1, wherein the fourth mechanical hand comprises a fourth lifting cylinder, a fourth extending cylinder, a fourth clamping cylinder, and a pair of fourth claws;
wherein the fourth lifting cylinder is fixedly mounted on the second sliding piece, the fourth extending cylinder is fixedly mounted on a piston of the fourth lifting cylinder, the fourth clamping cylinder is fixedly mounted on a piston rod of the fourth extending cylinder, the fourth extending cylinder drives the fourth clamping to move levely, the first clamping cylinder moves levely in a perpendicular direction to the pair of parallel tracks, the fourth clamping cylinder is a double piston cylinder, and the pair of fourth claws are fixedly mounted on the double pistons of the fourth clamping cylinder;
wherein the fourth clamping cylinder through a sliding piece is fixedly mounted on a piston rod of the fourth extending cylinder, the sliding piece is fixedly connected with the piston rod of the fourth extending cylinder, and a cylinder body of the fourth extending cylinder is provided with a sliding slot that couples with the sliding piece.

* * * * *